May 4, 1954     V. H. WALLINGFORD     2,677,304
DEVICE FOR USE IN INSPECTING CONTENTS OF VESSELS
Filed Feb. 26, 1951     3 Sheets-Sheet 1
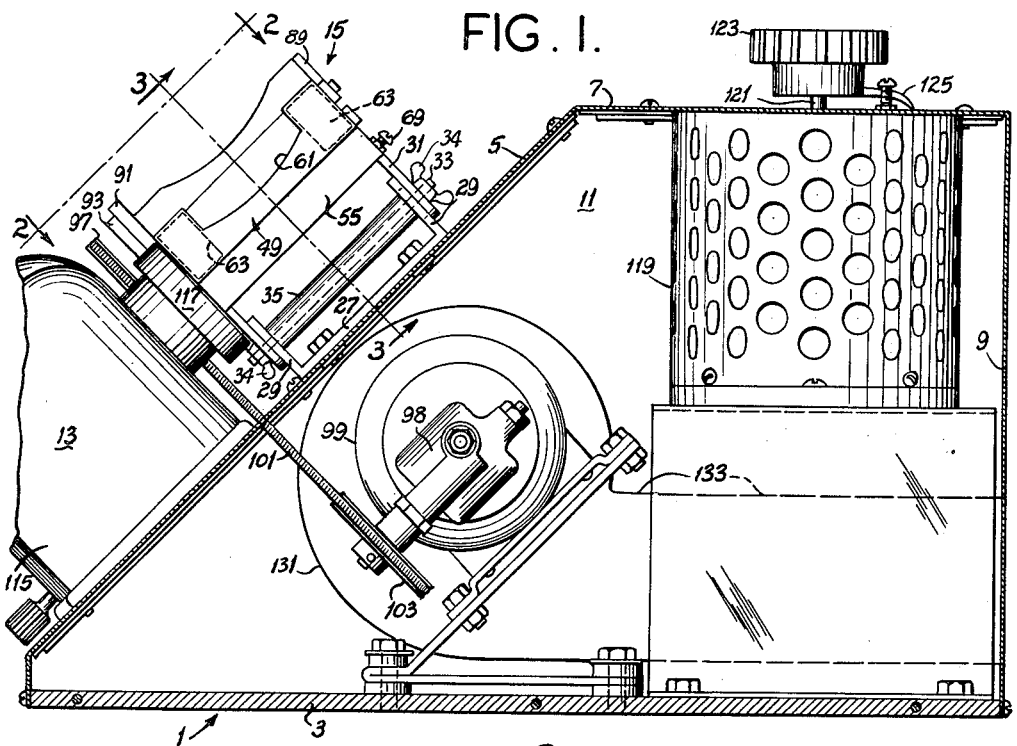
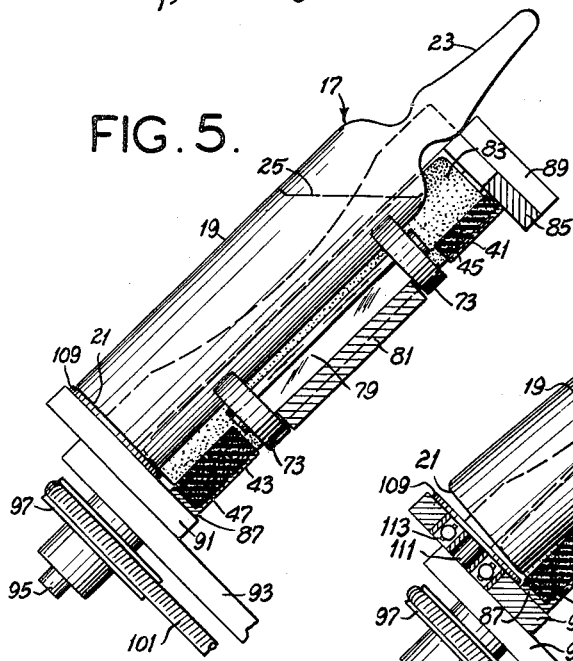
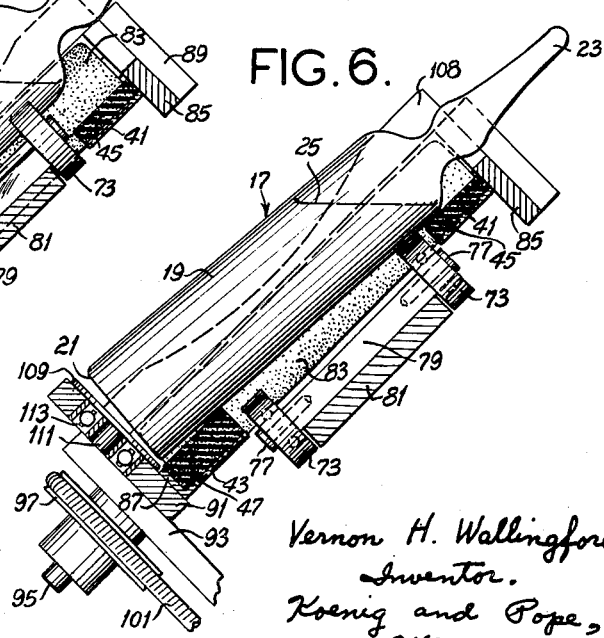
Vernon H. Wallingford,
Inventor.
Koenig and Pope,
Attorneys.

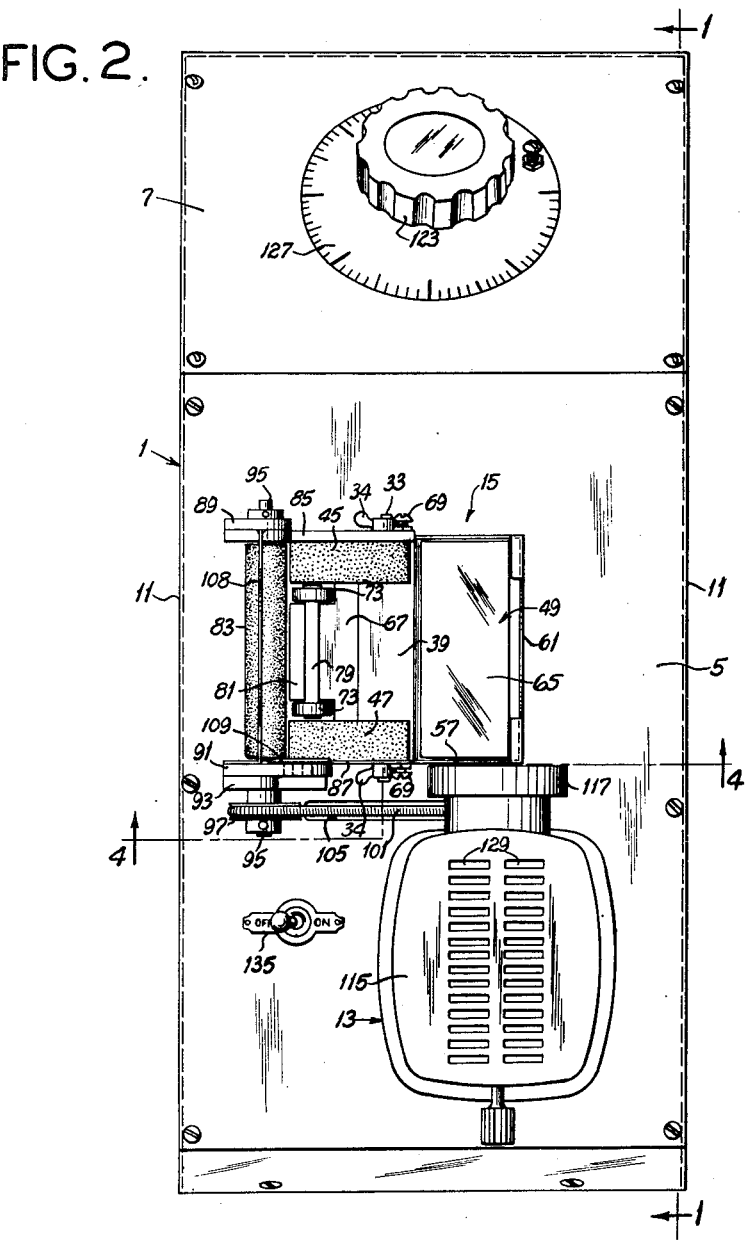

May 4, 1954  V. H. WALLINGFORD  2,677,304
DEVICE FOR USE IN INSPECTING CONTENTS OF VESSELS
Filed Feb. 26, 1951  3 Sheets-Sheet 3

Vernon H. Wallingford,
Inventor.
Koenig and Pope,
Attorneys.

Patented May 4, 1954

2,677,304

UNITED STATES PATENT OFFICE 2,677,304

DEVICE FOR USE IN INSPECTING CONTENTS OF VESSELS

Vernon H. Wallingford, Ferguson, Mo., assignor to Mallinckrodt Chemical Works, St. Louis, Mo., a corporation of Missouri Application February 26, 1951, Serial No. 212,720

17 Claims. (Cl. 88—14)

This invention relates to devices for use in the visual inspection of the contents of liquid-containing closed transparent vessels, more particularly ampules, to determine whether there is an objectionable quantity of foreign or undissolved matter therein.

The invention, as herein disclosed, is particularly concerned with devices for use in the inspection of ampules, but it will be understood that its principles are applicable to devices for use in the inspection of liquid-containing closed transparent vessels in general.

In the commercial production of ampules, and particularly ampules of the type containing a measured quantity of a solution of a pharmaceutical product such as an X-ray contrast medium, it is essential to inspect each ampule after it has been filled and sealed to determine whether the ampule contains objectionable foreign or undissolved matter such as would make it unacceptable. The object of this invention is the provision of a device for facilitating the visual inspection of ampules for this purpose, enabling an inspector visually to inspect ampules one after another in rapid succession with accurate results.

The invention makes use of the principle that particles of foreign or undissolved matter in a liquid in a transparent vessel may be much more readily detected by eye if the contents of the vessel are inspected under illumination while in motion, most desirably while in spinning motion, with the vessel itself at rest.

In general, a device of this invention comprises means for supporting a vessel, particularly an ampule, in an inspection position wherein its contents are illuminated. Adjacent the supporting means is a means for rotating or spinning a vessel preparatory to inspection thereof. This spinning means is adapted for manual application of a vessel thereto. The device further comprises means acting in response to manual removal of a vessel from inspection position for effecting transfer of a spinning vessel from the spinning means to inspection position, spinning of the vessel being stopped upon transfer, the contents of the vessel, however, continuing to spin for some time. With this arrangement, the inspector can readily apply a vessel to the spinning means to cause the vessel to be spun preparatory to inspection, while a vessel in inspection position is being viewed, so that the contents of the vessel applied to the spinning means are brought up to such spinning speed that they may continue to spin long enough for an adequate inspection after the vessel itself has stopped spinning. Having completed the inspection of the vessel in inspection position, the inspector removes the inspected vessel, whereupon the vessel being spun is immediately transferred to inspection position for inspection. Another vessel is applied to the spinning means, and so on in sequence. In this way, an inspector can easily and accurately inspect a large number of vessels in rapid succession. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a side elevation of a device embodying the invention, illustrating a cabinet thereof in vertical section on the line 1—1 of Fig. 2;

Fig. 2 is an inclined view taken on inclined line 2—2 of Fig. 1;

Fig. 5 is a section on line 5—5 of Fig. 4, illustrating an ampule in spinning position; and Fig. 6 is a section on line 6—6 of Fig. 3, illustrating the position of an ampule moving from spinning position to inspection position.

Similar reference characters indicate corresponding parts throughout the several views of the drawings.

Figure 3:
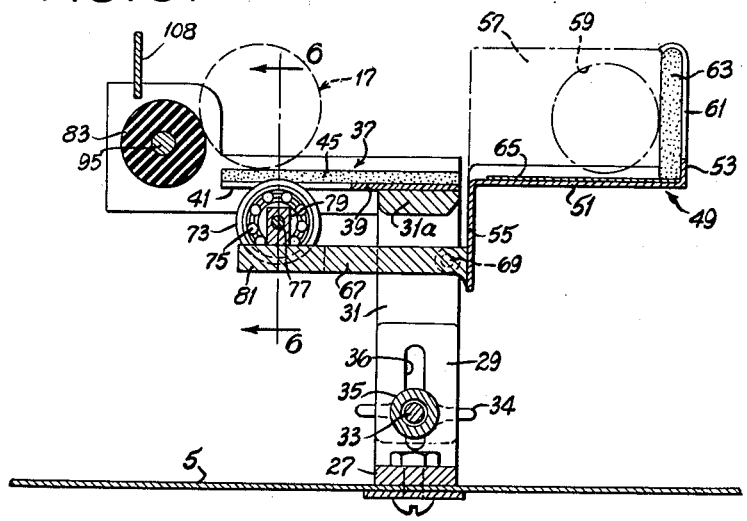
Fig. 3 is an enlarged section taken on line 3—3 of Fig. 1, illustrating a cradle of the device in a raised position.

Referring to the drawings, first more particularly to Figs. 1 and 2, one specific embodiment of the invention is shown to comprise a cabinet, generally designated 1, having a bottom 3, an inclined front panel 5, a horizontal top 7, a vertical rear wall 9 and side walls 11. The panel 5 is inclined at an angle of about 45°. It forms a base for a lantern projector 13 for projecting a beam of light, and for mechanism generally designated 15 comprising means for supporting a vessel in inspection position wherein its contents are illuminated by the beam of light, means for spinning a vessel, and means acting in response to manual removal of a vessel from inspection position for effecting transfer of a vessel from the spinning means to inspection position.

As illustrated, mechanism 15 is particularly adapted for handling filled, sealed ampules such as the ampule 17 shown in Figs. 5 and 6. Ampule 17 has a cylindrical body 19, a flat bottom 21 and a neck 23, and contains liquid 25. By way of example, a typical ampule is four and one-half inches long from its bottom to the end of the neck, and its cylindrical body 19 has a diameter of about fifteen-sixteenths of an inch.

The mechanism 15 comprises a mounting including a member 27 fixed upon the inclined panel 5 having upstanding flanges 29 at its ends. A frame 31 of inverted U-shape has the lower ends of its legs adjustably secured to the flanges 29 by a bolt 33 and wing nuts 34, and extends upward perpendicular to the panel. A cylindrical spacer 35 surrounds the bolt. Adjustment of the frame 31 is permitted by having the bolt extending through elongate slots 36 in the flanges. The frame 31 is located in a vertical plane parallel to the side walls of the cabinet. Its upper bar 31a, which parallels the panel 5, supports a track generally designated 37. The track comprises a base plate 39 spaced above the inclined panel 5 in a plane parallel to the panel. Plate 39 has narrow upper and lower extensions 41 and 43 extending to the left (see Figs. 3, 5 and 6). On the plate 39 and its extensions are an upper rail 45 and a lower rail 47 extending crosswise of the panel 5. The rails, as shown, are strips of rubber of rectangular cross section. The lower rail 47 is thicker and hence relatively higher than the upper rail 45. The track extends to the left as viewed in Figs. 2–4 (this being as viewed from the front of the device) from the top of support 31.

Figure 4:
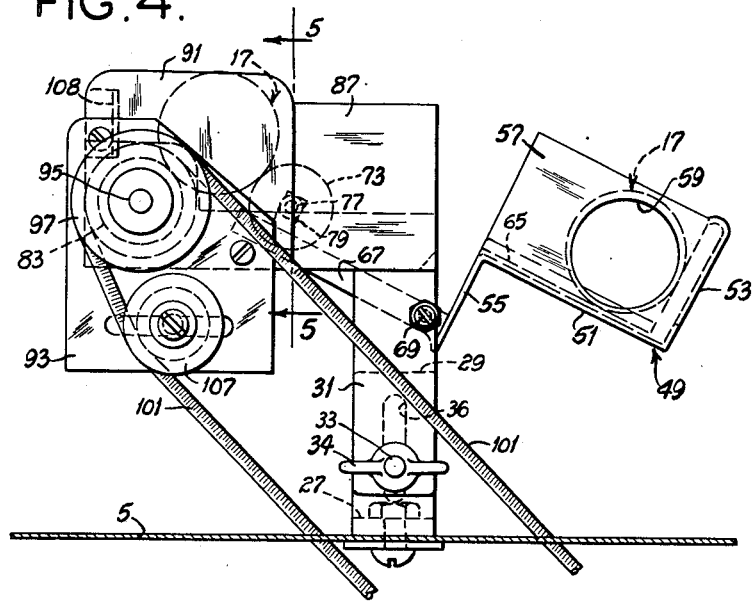
Fig. 4 is an enlarged section taken on line 4—4 of Fig. 2, illustrating the cradle in a lowered, inspection position.

The means for supporting a vessel or ampule in inspection position comprises a cradle 49 mounted for rocking movement between the raised position adjacent the right end of the track 37 shown in Fig. 3 and the lowered inspection position shown in Fig. 4. The cradle 49 has a bottom 51, an upstanding side wall 53, and a flange 55 extending downward at the edge of the bottom opposite the side wall 53. It also has a lower end wall 57 having an aperture 59 which is aligned with the beam of light projected by the projector 13 when the cradle is in inspection position. The side wall 53 of the cradle has a cut-out 61, allowing an ampule in the cradle to be readily grasped for removal, and its inner side is padded by rubber 63. The bottom 51 has a piece of black paper 65 pasted thereon, to afford a dark background for an ampule under inspection.

The downwardly extending flange 55 of the cradle is secured adjacent its lower end to a rocking member consisting of a plate 67 mounted for pivotal movement by means of pivot pins 69 secured in the legs of the frame 31. Pivot pins 69 locate the pivotal axis of the plate 67 parallel to and at the inclination of the inclined panel 5 under the right end of and transverse to the track 37, in such position that the cradle may assume the raised position shown in Fig. 3 wherein its bottom 51 parallels the panel 5 at the general level of the track 37. In this position, plate 67 is generally parallel to the panel 5. The plate 67, which is relatively heavy as regards the cradle 49, extends to the left from its pivotal axis and adjacent its left end carries a pair of idler rollers 73. These rollers are constituted by the outer races of ball bearings 75 mounted by means of screws 77 at the ends of a bar 79 secured to the top of a narrow extension 81 of the plate 67.

Rollers 73 are adapted to cooperate with a positively driven spinning roller 83 for cradling an ampule when the cradle 49 is in its lowered inspection position of Fig. 4, this position being determined by engagement of the member 67 with the bar 31a. Spinning roller 83 is located outward of the left end of the track 37 with its axis parallel to the pivotal axis of the carrier 49 and above the track. When the cradle 49 is in its raised Fig. 3 position, rollers 73 occupy a position below the level of the track inward from its left end. When the cradle 49 rocks downward to its Fig. 4 inspection position, the rollers 73 are raised to an ampule-cradling position projecting above the level of the track at the right of spinning roller 83, moving upward between the rails 45 and 47 through the opening between the extensions 41 and 43 and rails 45 and 47 (see Figs. 4 and 5).

An arm 85 extends to the left from the upper end of the frame 31 alongside the upper rail 45. A thin plate 87, an integral part of plate 89, extends to the left from the lower end of the frame 31 alongside the lower rail 47. Arm 85 carries a bearing block 89 at its outer end. Plate 87 carries two bearing blocks 91 and 93 at its outer end. The spinning roller 83 comprises a rubber roller having a shaft 95 journalled in bearings in the bearing blocks. The shaft has a pulley 97 at its lower end. Within the cabinet 1 is an electric motor 99 (Fig. 1) for driving the shaft 95 through a speed reducer 99 and a belt 101 trained around the pulley 97 and a pulley 103 on the output shaft of the speed reducer. The belt 101 extends through a slot 105 (Fig. 2) in panel 5. The bearing block 93 projects below the block 91 and carries an adjustable belt-tensioning pulley 107 (Fig. 4). The spinning roller 83 is driven counterclockwise as viewed in Figs. 3 and 4. A guard rail 108 spans bearing blocks 89 and 91 above and to the left of the axis of roller 83.

When the cradle 49 is in its Fig. 4 inspection position, rollers 73 are in raised position to act in cooperation with the spinning roller 83 to cradle an ampule and hold the ampule in engagement with roller 83 to be driven thereby. Since an ampule cradled in the rollers is inclined, and would otherwise tend to slide downward, a rotary support 109 is provided to hold the ampule cradled in the rollers. The support 109 comprises a disc having a stud 111 journalled by means of a ball bearing 113 in the bearing block 91 (see Fig. 5) with its axis parallel to the axis of the rollers and positioned for alignment with the axis of an ampule cradled in the rollers.

The projector 13, which is a commercially available item, comprises a lamp housing 115 in which is a lamp (not specifically illustrated). The housing is mounted on the inclined panel 5 in position for alignment of the beam of light projected through the projector barrel 117 with the aperture 59 in the end wall 57 of the cradle 49 when the latter is in inspection position. The end of the barrel 117 is in close proximity to the cradle end wall 57. The lamp is connected in a circuit including a variable rheostat 119 (Fig. 1) mounted in the cabinet having an adjusting shaft 121 extending through an opening in the top 7 of the cabinet, with a knob 123 on the upper end of the shaft. The knob has a pointer 125 cooperating with a dial 127 on the top 7. The top of the lamp housing is formed as a grille, as indicated at 129, and the lamp housing is open at its bottom through an opening in panel 5 to the interior of the cabinet. A blower 131 is mounted in the cabinet, driven by the motor 99.

The blower draws air in through the grille 129 and exhausts it through a duct 133 leading to an opening in the rear wall of the cabinet to cool the projector. At 135 is shown a switch for the motor and lamp.

The cradle 49 is biased upward to its raised Fig. 3 position because of the overbalancing effect of plate 67. However, the weight of an ampule in the cradle is sufficient not only to overbalance the plate 67, but also the component of the weight of an ampule borne by rollers 73.

Operation is as follows:

While a succession of ampules is being inspected, motor 99 and the lamp of the projector are constantly energized. Consequently, spinning roller 83 is continuously driven, rotating counterclockwise as viewed in Figs. 3 and 4. Assuming that there is an ampule in the cradle 49, this holds the cradle in its lowered inspection position and the cradling rollers 73 in raised, ampule-cradling position (Figs. 4 and 5). Assuming that an ampule is cradled in the spinning roller 83 and rollers 73, this ampule will be spun clockwise as viewed in Fig. 4, being held up above the track 37.

Upon manual removal of the ampule from the cradle 49, the weight tending to hold the cradle in its lowered inspection position of Fig. 4 is removed, and the plate 67 and cradle 49 rock counterclockwise from their Fig. 4 to their Fig. 3 position. As rollers 73 move below the level of the track 37, the support for the spinning ampule is withdrawn, and this ampule drops down on to the rails 45 and 47 as illustrated in Fig. 6. It then rolls to the right on the rails, rolling occurring because the ampule is spinning clockwise as viewed in Fig. 3. As the ampule rolls on the rails, its bottom remains in engagement with plate 87 to prevent the ampule from sliding downward. Due to the rail 45 being of less height than rail 47, the rolling ampule assumes a tilted position relative to the upper surfaces of the rails and the plate 87 (Fig. 6) and this facilitates its rolling.

The rolling ampule rolls off the right end of the rails on to the bottom 51 of the cradle 49, being brought to a stop against the rubber pads 63 on the side wall 53 of the cradle. The ampule stops spinning as soon as it rolls on to the cradle due to the braking action of pads 63 and paper 65. However, its liquid contents continue to spin. Also, as soon as the ampule rolls on to the cradle the weight of the ampule rocks the cradle downward to its lowered inspection position (Fig. 4) wherein the spinning contents of the ampule are illuminated by the beam of light projected by the projector 13 through the aperture 59 in the end wall 57 of the cradle and through the bottom of the ampule. If there is any foreign or undissolved matter in the liquid in the ampule, it is readily observed by reason of light reflecting therefrom as such matter spins around with the liquid.

With the cradle held down in inspection position by an ampule therein, the rollers 73 are held up in cradling position (Fig. 4). The inspector can then cradle another ampule to be inspected in the spinning roller 83 and rollers 73 so that the contents of this ampule are brought up to such speed as to keep spinning for a sufficient time upon transfer to the cradle as to permit inspection. When the inspection of the ampule in the cradle 49 has been completed, it is removed, and this automatically effects transfer of the ampule being spun to the cradle as previously described.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A device for use in the visual inspection of transparent vessels containing a liquid, comprising means for supporting a vessel in an inspection position wherein its contents are illuminated, means adjacent the supporting means for spinning a vessel, and means acting in response to manual removal of a vessel from inspection position for effecting transfer of a spinning vessel from the spinning means to inspection position, spinning of the vessel being stopped upon transfer, its contents continuing to spin.

2. A device as set forth in claim 1 wherein the vessel in inspection position is illuminated by a beam of light projected through the bottom of the vessel.

3. A device for use in the visual inspection of transparent vessels containing a liquid, comprising a cradle for a vessel mounted for movement into and out of an inspection position wherein the contents of the vessel carried thereby are illuminated, the cradle being biased away from said inspection position and being adapted to be held in inspection position against its bias by the weight of a vessel carried thereby, means adjacent the cradle for spinning a vessel, and means controlled by the cradle adapted to hold a vessel in engagement with the spinning means when the cradle is in inspection position and acting in response to movement of the cradle out of inspection position upon removal of a vessel from the cradle to effect transfer of a spinning vessel from the spinning means to the cradle, spinning of the vessel being stopped upon transfer, its contents continuing to spin.

4. A device as set forth in claim 3 wherein the vessel in inspection position is illuminated by a beam of light projected through the bottom of the vessel.

5. A device for use in the visual inspection of transparent vessels of generally circular cross section containing a liquid, comprising a cradle for a vessel mounted for movement into and out of an inspection position wherein the contents of the vessel carried thereby are illuminated, the cradle being biased away from said inspection position and being adapted to be held in inspection position against its bias by the weight of the vessel carried thereby, means adjacent the cradle for spinning a vessel, and means carried by and movable with the cradle for holding a vessel in engagement with the spinning means when the cradle is in inspection position and adapted to release the vessel to roll into the cradle when the cradle moves away from inspection position upon removal of a vessel therefrom, spinning of the vessel being stopped upon rolling into the cradle, the contents of the vessel continuing to rotate.

6. A device as set forth in claim 5 wherein the vessel in inspection position is illuminated by a beam of light projected through the bottom of the vessel.

7. A device for use in the visual inspection of transparent vessels of generally circular cross section containing a liquid, comprising a track on which a vessel may roll, a cradle for holding a vessel mounted for rocking movement between a raised position adjacent one end of the track for receiving a vessel rolling off said end and a lowered inspection position wherein the contents of a vessel carried by the cradle are illuminated, a positively driven roller located at the other end of the track with its axis transverse to the track and projecting above the track, and a cradling roller movable with the cradle, said cradling roller projecting above the track in such position that a vessel may be cradled in the rollers above the track for being spun when the cradle is in inspection position, the cradle normally being biased to its raised vessel-receiving position in which the cradling roller is below the track, and being adapted to be held in inspection position by the weight of a vessel carried by the cradle.

8. A device for use in the visual inspection of ampules, comprising a transversely inclined track, a member mounted for rocking movement on an inclined axis extending transversely to the track under the track and generally parallel to the plane of the track, said member having an ampule cradle on one side of its axis for holding an ampule in inclined position, said cradle being swingable with said member between a raised position adjacent one end of the track for receiving an ampule rolling off said end of the track and a lowered inspection position, a lantern projector for projecting a beam of light through the bottom of an ampule in the cradle when the cradle is in inspection position, an ampule cradling roller carried by said member on the other side of the axis of said member from the cradle, said cradling roller occupying a retracted position below the track when the cradle is raised and occupying a raised position above the track when the cradle is lowered, and an ampule spinning roller rotary on a fixed axis at the other end of the track generally parallel to the axis of said member so located that when the cradling roller is in raised position, an ampule may be cradled in the spinning and cradling rollers and held raised above the track, said member being overbalanced on the side of its axis away from the cradle normally to bias the cradle upward to its raised position, the cradle being adapted to be held in its lowered inspection position by the weight of an ampule therein against not only said overbalance but also against the component of the weight of an ampule borne by the cradling roller.

9. A device as set forth in claim 8, further including a rotary support engageable by the bottom of an ampule cradled in the spinning and cradling rollers for preventing an ampule being spun from sliding downward.

10. A device as set forth in claim 8 wherein the track comprises an upper and a lower rail and the level of the upper track relative to the cradle is lower than the level of the lower track.

11. A device as set forth in claim 8 wherein the cradle is provided with a dark background for the ampule.

12. A device as set forth in claim 8 wherein the cradle is provided with means for braking rotation of the ampule.

13. A device for use in the visual inspection of ampules, comprising a cabinet having an inclined front panel, a track mounted on the panel extending crosswise of the panel in a plane generally parallel to the plane of the panel, a member mounted for rocking movement on an inclined axis extending transversely to the track under the track and generally parallel to the plane of the track, said member having an ampule cradle on one side of its axis for holding an ampule in inclined position, said cradle being swingable between a raised position adjacent one end of the track for receiving an ampule rolling off said end of the track and a lowered inspection position, a lantern projector mounted in inclined position on the panel for projecting a beam of light through the bottom of an ampule in the cradle when the cradle is in inspection position, an ampule cradling roller carried by said member on the other side of the axis of said member from the cradle, said cradling roller occupying a retracted position below the track when the cradle is raised and occupying a raised position above the track when the cradle is lowered, an ampule spinning roller rotary on a fixed axis at the other end of the track generally parallel to the axis of said member so located that when the cradling roller is in raised position, an ampule may be cradled in the spinning and cradling rollers and held raised above the track, said member being overbalanced on the side of its axis away from the cradle normally to bias the cradle upward to its raised position, the cradle being adapted to be held in its lowered inspection position by the weight of an ampule therein against not only said overbalance but also against the component of the weight of an ampule borne by the cradling roller, and an electric motor housed in the cabinet coupled to drive the spinning roller in such direction that when the cradling roller is retracted, the spinning ampule will be lowered on to the track and roll toward and off said one end of the track on to the cradle.

14. A device as set forth in claim 13, further including a rotary support engageable by the bottom of an ampule cradled in the spinning and cradling rollers for preventing an ampule being spun from sliding downward, and means for preventing an ampule rolling on the track to the cradle from sliding downward.

15. A device as set forth in claim 13 wherein the track comprises an upper rail and a lower rail and the level of the upper rail relative to the cradle is lower than the level of the lower rail.

16. A device as set forth in claim 13 wherein the cradle has a bottom wall, a side wall and a lower end wall, the latter having an opening therein for the beam of light.

17. A device as set forth in claim 16 wherein the cradle is padded and its bottom wall provides a dark background for an ampule under inspection.

References Cited in the file of this patent

UNITED STATES PATENTS

| Number | Name | Date |
|---|---|---|
| 1,679,402 | Brown | Aug. 7, 1928 |
| 2,021,696 | Miller | Nov. 19, 1935 |
| 2,323,636 | Weathers | July 6, 1943 |
| 2,531,529 | Price | Nov. 28, 1950 |